Patented Oct. 10, 1939

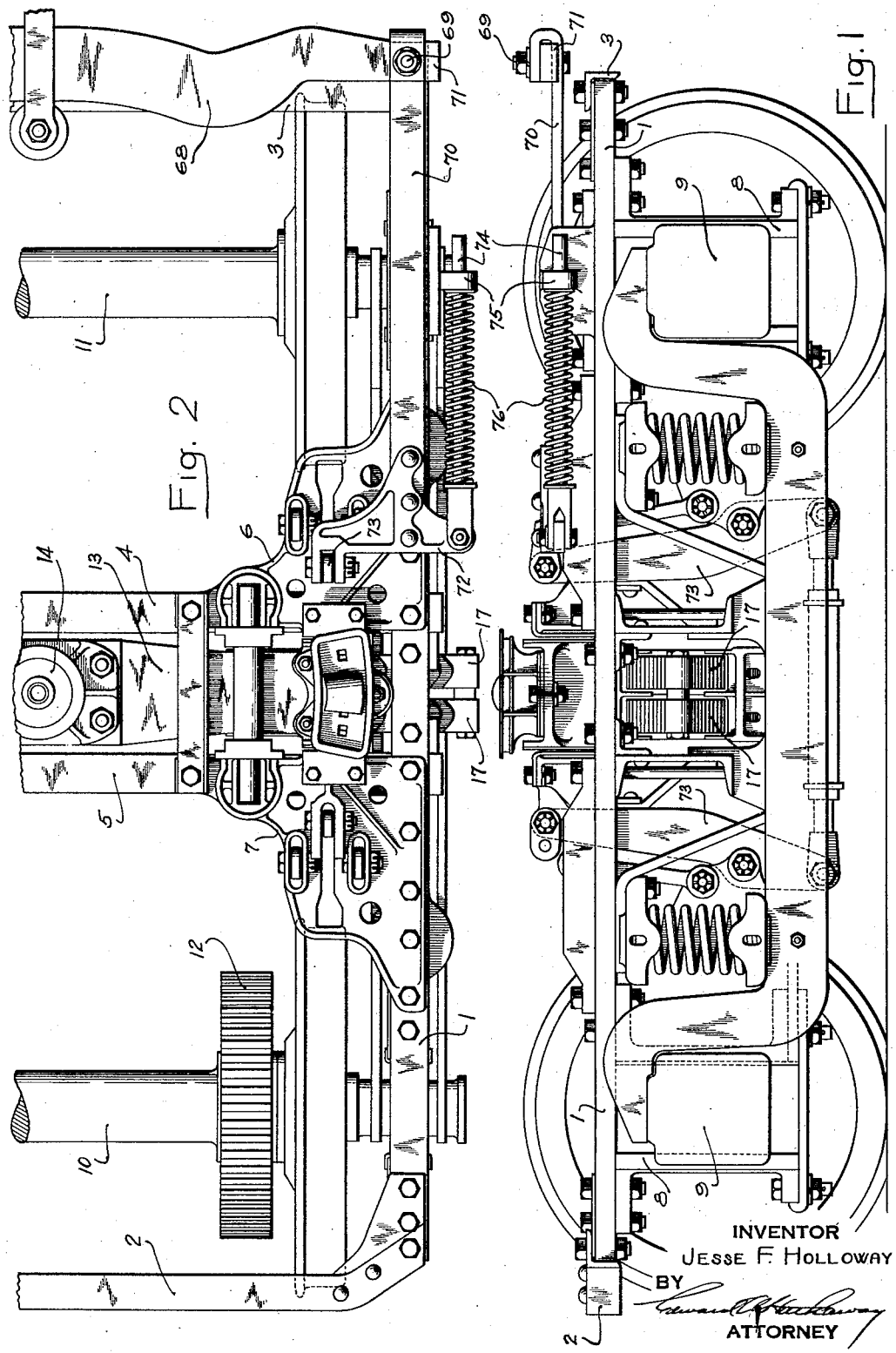

2,175,171

UNITED STATES PATENT OFFICE 2,175,171

TRUCK BRAKE MECHANISM

Jesse F. Holloway, Aldan, Pa.

Application March 26, 1938, Serial No. 198,265

2 Claims. (Cl. 188—53)

This invention relates generally to trucks for railway equipment and more particularly to braking equipment for trucks especially adapted for high speed electric passenger cars although the braking equipment herein disclosed may be employed in trucks for other classes of railway vehicles or service.

A great many brake truck designs have heretofore been proposed or built, particularly for present-day types of high speed equipment, but the same have been deficient in providing a high degree of stability, ruggedness and ease and positiveness of operation.

It is one object of my present invention to provide improved braking equipment that has extraordinary stability and ruggedness combined with ease and positiveness of operation together with being compact and accessible for inspection and repair as well as being economical in maintenance and original cost.

Other objects and advantages will be more apparent to those skilled in the art from the following description of the accompanying drawing in which:

Fig. 1 is a side elevation of a truck embodying my improved features;

Fig. 2 is a plan view of Fig. 1 showing one-half of a truck.

In the illustrated embodiments of my invention which are shown herein merely for the purpose of disclosing certain specific forms among possible others that the invention might take, I have provided in Fig. 2 a truck of a conventional standard form having a frame comprising a pair of parallel wheel pieces 1 connected by end pieces 2 and 3 and transoms 4 and 5. In this built-up form of truck shown in Fig. 2, the transoms and wheel pieces are connected by any suitable or usual types of gussets such as 6 and 7. The wheel pieces have pedestals 8 for guiding usual journal boxes 9. The wheel axles 10 and 11 are journalled in said boxes and may if desired be provided with a driving gear 12.

Disposed between the transoms 4 and 5 is a usual swing bolster 13 having a center bearing 14 for supporting any suitable car body or frame on bolster springs 17.

The brake rigging includes a brake cross equalizer beam 68, Fig. 2, pivotally connected as at 69 to a brake pull rod 70. The pivotal end of the pull rod is reversely bent over the equalizer 68, while the outer end of the equalizer is downturned as at 71 to prevent pull rod 70 from sliding off of the equalizer 68 in case pivotal bolt 69 drops out. It is understood, of course, that the construction as shown is duplicated on each side of the truck. The inner end of pull rod 70 is secured to a cast member 72 whose inner end is pivotally secured to a vertical brake lever 73 and whose outer end is pivotally connected to a spring rod 74. Surrounding this rod and interposed between a shoulder thereon and a lug 75 projecting outwardly from the wheel piece 1 is a compression spring 76 adapted normally to move pull rod 70 and equalizer 68 inwardly to release the brakes. As a result of these compression brake release springs, I am able to provide a very effective brake rigging adapted for smooth and positive operation combined with the many desirable features set forth in the objects hereof.

It will of course be understood that various changes in details of construction and arrangement of parts may be made by those skilled in the art without departing from the spirit of the invention as set forth in the appended claims.

I claim:

1. A railway truck comprising, in combination, a frame, a transverse brake equalizer beam, brake pull rods pivotally secured to said equalizer beam and extending longitudinally of said truck frame, and compression release springs interposed between said frame and pull rods, said equalizer beam having angularly turned ends and said brake pull rods having reversely bent ends adapted for lateral engagement with said angularly turned ends of the equalizer beam.

2. A railway truck comprising, in combination, a frame, a transverse brake equalizer beam, brake pull rods pivotally secured to said equalizer beam and extending longitudinally of said truck frame, and means for interlocking said beam and pull rods including angularly turned ends on one of the same and a reversely bent end on the other thereof, said reversely bent end being adapted for lateral engagement with said angularly turned end.

JESSE F. HOLLOWAY.